United States Patent
Fukunaga et al.

(10) Patent No.: US 11,871,116 B2
(45) Date of Patent: Jan. 9, 2024

(54) IMAGE CAPTURING APPARATUS, IMAGE CAPTURING METHOD, AND STORAGE MEDIUM FOR CALCULATING IMAGE CAPTURING CONDITION WHICH ENABLES PRIVACY OF OBJECT TO BE PROTECTED

(71) Applicant: CANON KABUSHIKI KAISHA, Tokyo (JP)

(72) Inventors: Kentaro Fukunaga, Kanagawa (JP); Kanta Sunami, Kanagawa (JP); Toshiyuki Fukui, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/585,278

(22) Filed: Jan. 26, 2022

(65) Prior Publication Data
US 2022/0247910 A1     Aug. 4, 2022

(30) Foreign Application Priority Data

Jan. 29, 2021  (JP) .............................. 2021-013539
Jan. 29, 2021  (JP) .............................. 2021-013540

(51) Int. Cl.
*H04N 23/72*     (2023.01)
*G06F 21/62*     (2013.01)
*H04N 5/272*     (2006.01)
*H04N 23/71*     (2023.01)

(52) U.S. Cl.
CPC ......... *H04N 23/72* (2023.01); *G06F 21/6245* (2013.01); *H04N 5/272* (2013.01); *H04N 23/71* (2023.01)

(58) Field of Classification Search
CPC ........ H04N 23/72; H04N 5/272; H04N 23/71; H04N 23/611; H04N 23/62; H04N 23/635; H04N 23/73; H04N 23/76; H04N 23/50; G06F 21/6245; G06F 21/6254
See application file for complete search history.

(56) References Cited

U.S. PATENT DOCUMENTS

| | | | | |
|---|---|---|---|---|
| 8,610,787 | B2 * | 12/2013 | Namba | H04N 23/611 348/222.1 |
| 9,794,517 | B2 * | 10/2017 | Ha | H04N 5/272 |
| 11,153,477 | B2 * | 10/2021 | Park | H04N 23/75 |
| 2008/0180539 | A1 * | 7/2008 | Jung | H04N 5/272 348/222.1 |

FOREIGN PATENT DOCUMENTS

JP     4512763 B2    7/2010

* cited by examiner

*Primary Examiner* — Luong T Nguyen
(74) *Attorney, Agent, or Firm* — Canon U.S.A., Inc. IP Division

(57) ABSTRACT

An image capturing apparatus includes an image capturing unit configured to set an exposure condition for each of areas on an image capturing plane, a setting unit configured to set a privacy area in an image captured by the image capturing unit, a decision unit configured to decide an exposure condition of the privacy area set by the setting unit as an exposure condition that enables privacy of an object in the privacy area to be protected, and a control unit configured to execute control for causing the image capturing unit to capture an image of the object based on the exposure condition decided by the decision unit.

20 Claims, 11 Drawing Sheets

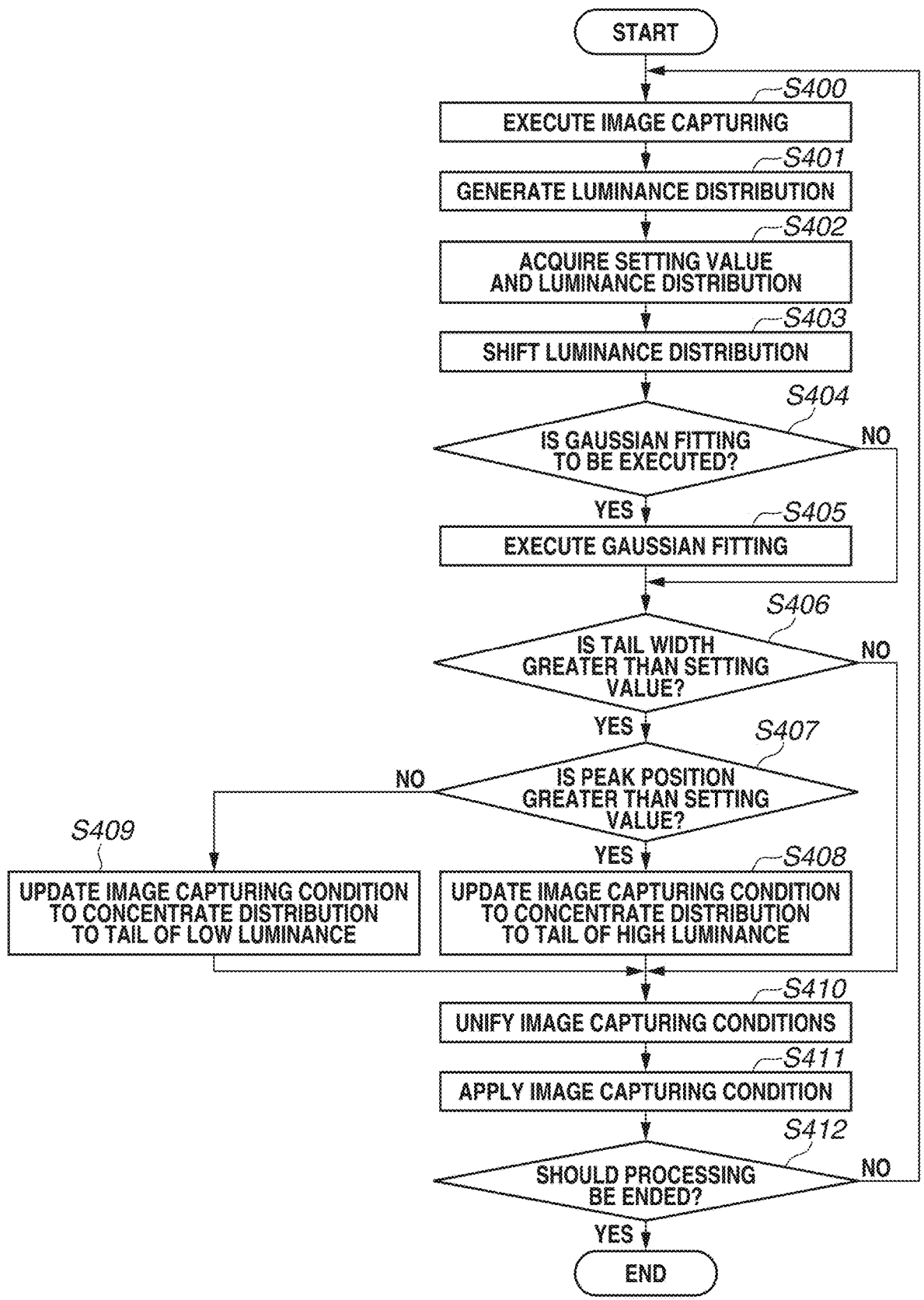

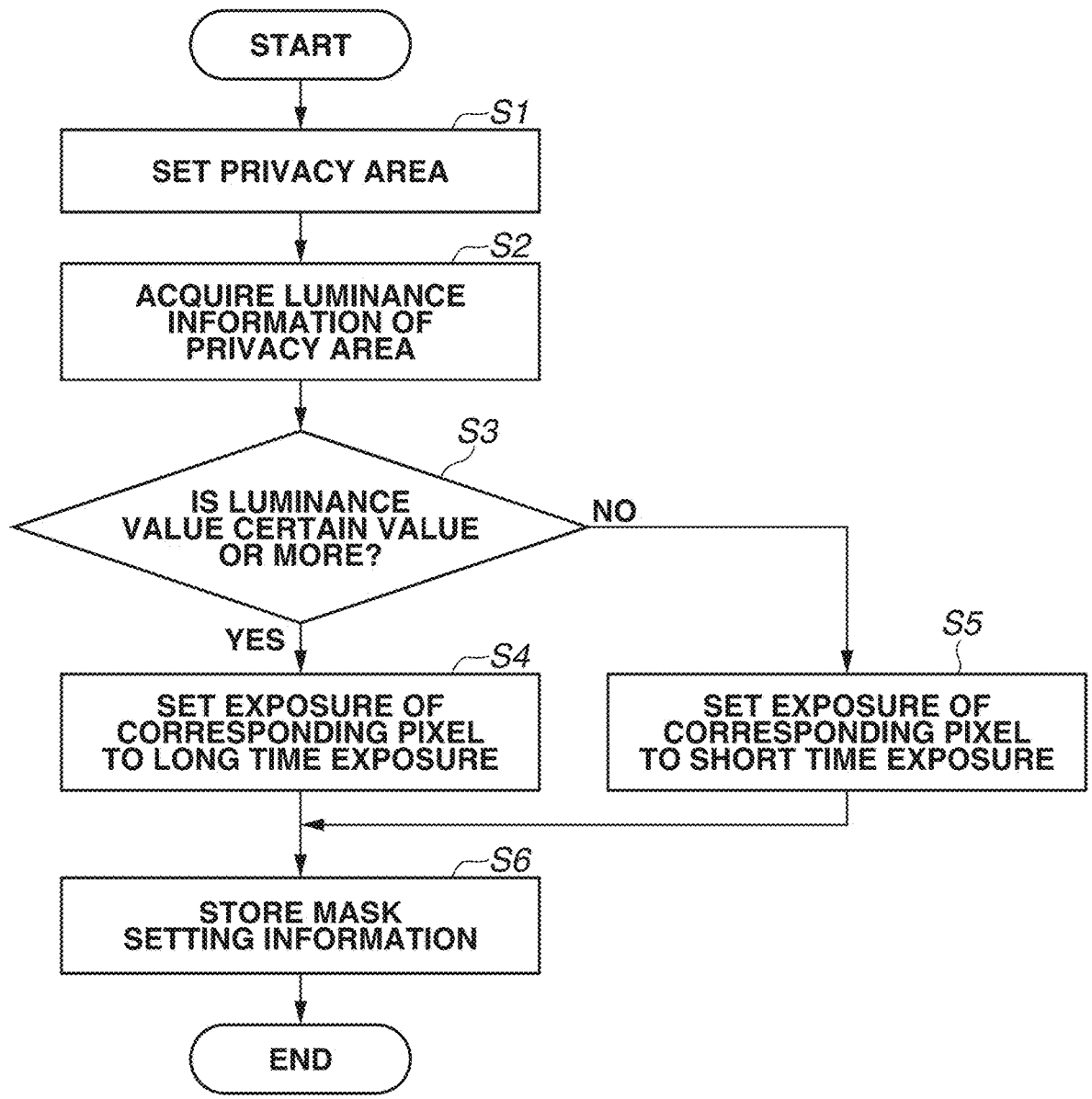

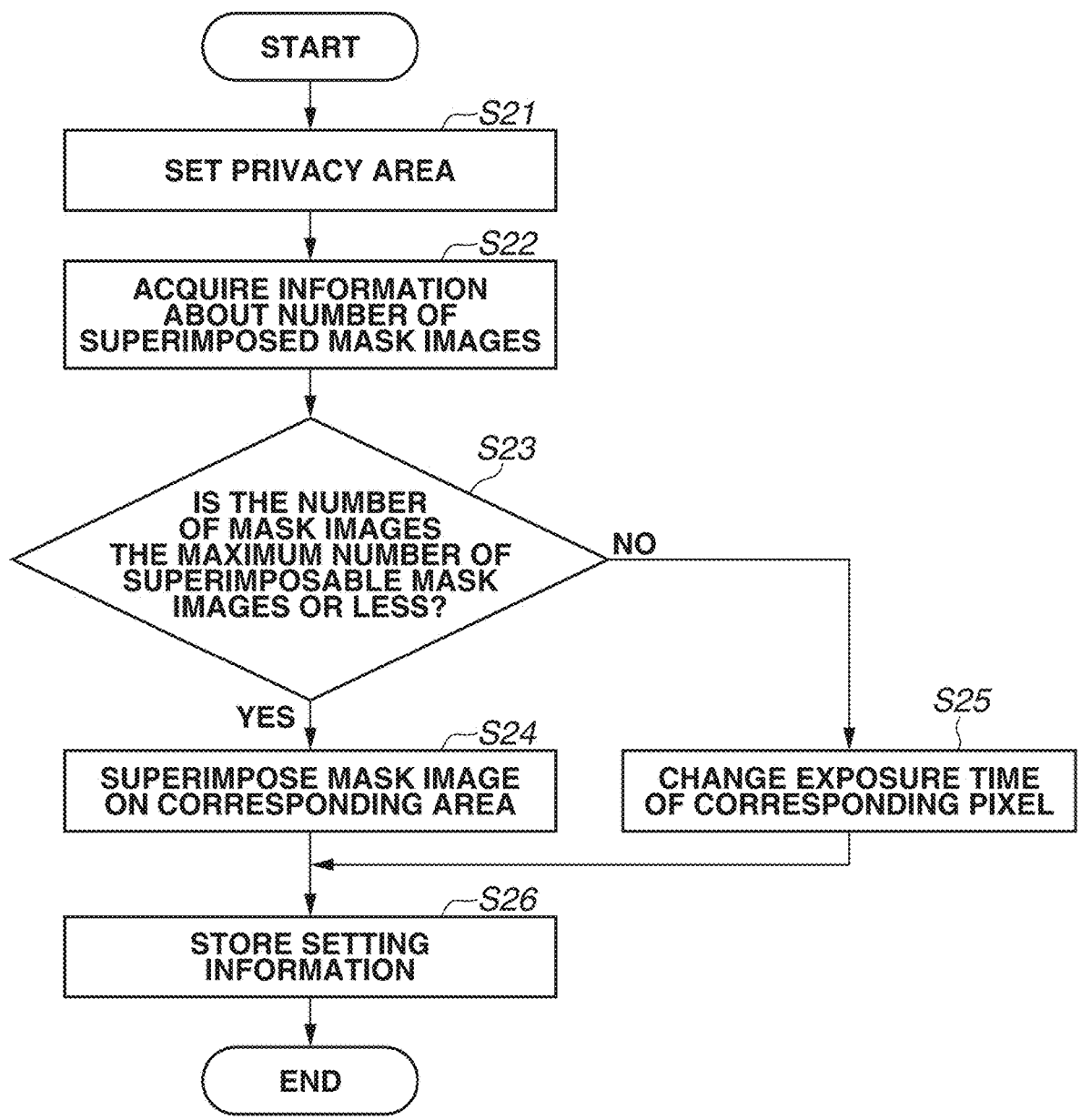

IMAGE CAPTURING APPARATUS, IMAGE CAPTURING METHOD, AND STORAGE MEDIUM FOR CALCULATING IMAGE CAPTURING CONDITION WHICH ENABLES PRIVACY OF OBJECT TO BE PROTECTED

BACKGROUND

Field of the Disclosure

The present disclosure relates to an image capturing apparatus, an image capturing method, and a storage medium.

Description of the Related Art

In order to prevent infringements of portrait rights or copyright, Japanese Patent No. 4512763 discusses a technique for executing image processing such as blurring processing on a predetermined interior area of image data.

SUMMARY

An image capturing apparatus includes an image capturing unit configured to set an exposure condition for each of areas on an image capturing plane, a setting unit configured to set a privacy area in an image captured by the image capturing unit, a decision unit configured to decide an exposure condition of the privacy area set by the setting unit as an exposure condition that enables privacy of an object in the privacy area to be protected, and a control unit configured to execute control for causing the image capturing unit to capture an image of the object based on the exposure condition decided by the decision unit.

Further features of various embodiments will become apparent from the following description of exemplary embodiments with reference to the attached drawings.

BRIEF DESCRIPTION OF THE DRAWINGS

FIG. 3 illustrates a flowchart of processing for calculating an image capturing condition according to the first exemplary embodiment.

FIG. 8 illustrates a flowchart of an example of mask setting processing.

FIG. 11 illustrates a flowchart of another example of the mask type changing processing.

DESCRIPTION OF THE EMBODIMENTS

Hereinafter, exemplary embodiments will be described with reference to the appended drawings. The exemplary embodiments described hereinafter are not intended to limit every embodiment, and not all of the combinations of features described in the exemplary embodiments are required as the solutions of every embodiment. Configurations described in the exemplary embodiments can be modified or changed as appropriate depending on specifications of a system and an apparatus to which the present disclosure is applied and various conditions, such as a use condition and a use environment. A technical range of the present disclosure is confirmed by a scope of the appended claims, and should not be confirmed by a particular exemplary embodiment described below.

An image capturing apparatus 100 according to a first exemplary embodiment will be described with reference to FIGS. 1 to 3 and FIGS. 4A to 4D. For example, the image capturing apparatus 100 is a monitoring camera installed on a wall or a ceiling in a room. The monitoring camera can execute operations, such as panning, tilting, and zooming.

Figure 1:
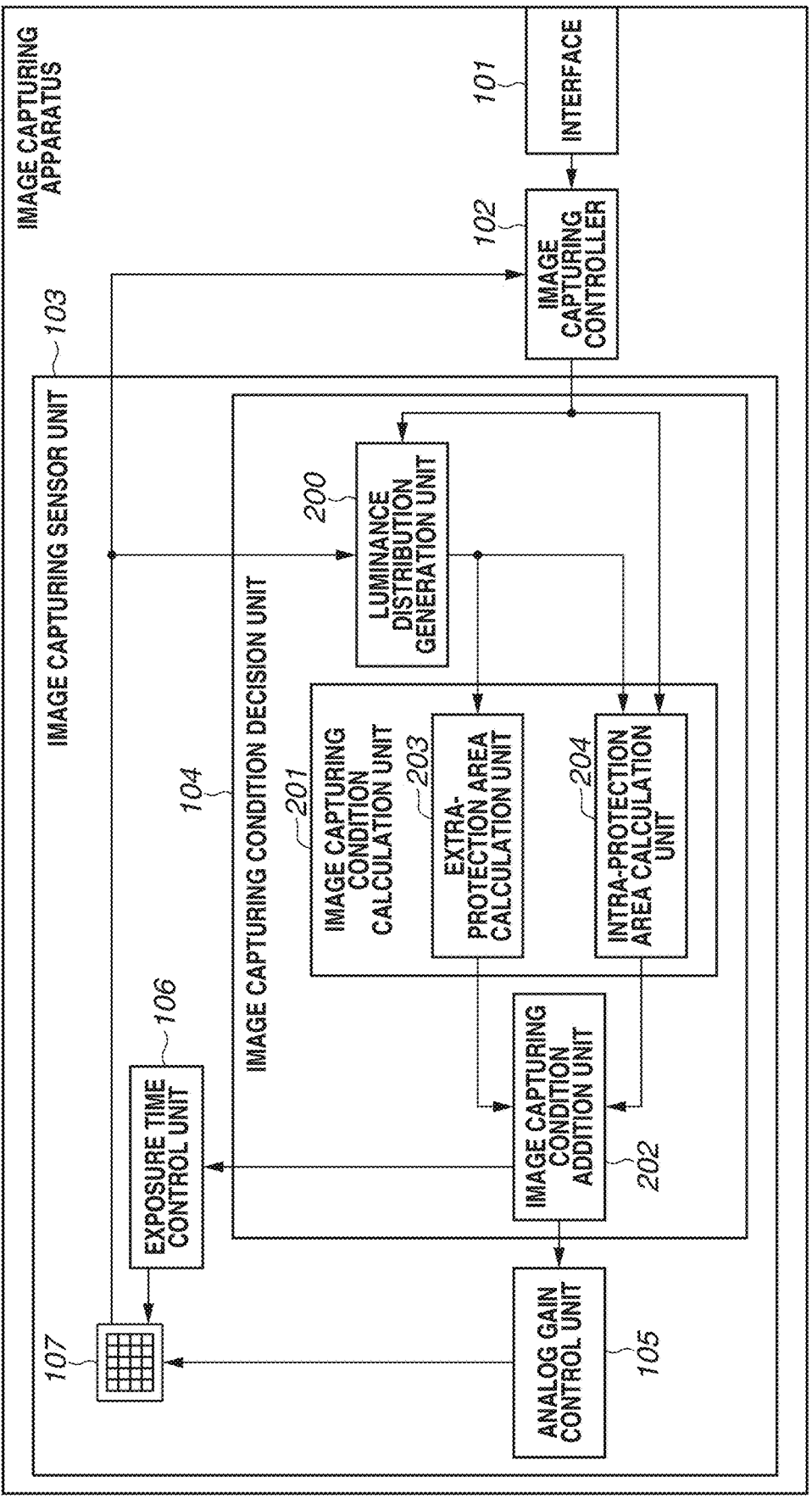
FIG. 1 illustrates a block diagram of a schematic configuration example of an image capturing apparatus according to a first exemplary embodiment.

The image capturing apparatus 100 illustrated in FIG. 1 calculates an image capturing condition in which an interior of a protection area (also referred to as a privacy area) of image data acquired through image capturing is unrecognizable or hardly recognizable, and executes image capturing under the calculated image capturing condition. The interior of the protection area refers to an area within a predetermined area specified by a user. For example, the protection area is an area which surrounds a human face, and may also be referred to as a "privacy area". The image capturing condition according to the present exemplary embodiment is a combination of exposure time and analog gain (luminance analog gain). The exposure time is used for instructing the image capturing unit (e.g., a photodiode (PD) unit 107 described below) when image capturing is performed. The analog gain is used for amplifying an analog luminance signal. The image capturing condition can also be referred to as "exposure condition". In the below-described exemplary embodiment, the PD unit 107 is also referred to as "PD unit 107". The image capturing condition according to the present exemplary embodiment is an image capturing condition which enables privacy of an object (e.g., a person) to be protected.

The image capturing apparatus 100 includes an interface 101, an image capturing controller 102, and an image capturing sensor unit 103.

The interface 101 serves as a receiving unit for receiving setting values set by the user. The setting values received by the interface 101 includes a threshold and a parameter which are used as references when a range of the protection area or the image capturing condition is calculated. The interface 101 is, for example, a communication interface (I/F) unit or a touch panel. In a case where the interface 101 is a communication I/F unit, the user inputs (transmits) a setting value to the image capturing apparatus 100 from a remote place through wired or wireless communication. In a case where the interface 101 is a touch panel, the user uses the interface 101 to input a setting value to the image capturing apparatus 100.

The image capturing controller 102 executes various types of image processing, such as white balance processing, noise reduction processing, and gamma correction processing, on the image data acquired by the PD unit 107. The image capturing controller 102 executes luminance gap correction on the image data to prevent a considerable luminance difference from occurring at a boundary between areas. The image capturing controller 102 further receives a setting (setting value) from the user via the interface 101, and reflects the setting from user on the image data.

Functions of the above described image processing do not always have to be mounted on the image capturing controller 102, and all or a part of the image processing functions may be stacked and mounted on the image capturing sensor unit 103.

The image capturing sensor unit 103 includes an image capturing condition decision unit 104, an analog gain control unit 105, an exposure time control unit 106, and a PD unit 107. The image capturing sensor unit 103 is configured to control an image capturing condition for each of areas on the image capturing plane. The image capturing sensor unit 103 acquires image data through image capturing that is executed according to the image capturing condition.

The PD unit 107 receives incident light through optical systems, such as a shutter and a lens. The PD unit 107 is configured of a color filter and an image sensor, such as a complementary metal oxide semiconductor (CMOS). The PD unit 107 serves as an image capturing unit for capturing an image of an object.

The analog gain control unit 105 controls an analog gain value used as the image capturing condition for each of the areas.

The exposure time control unit 106 controls the exposure time used as the image capturing condition for each of the areas.

The image capturing condition decision unit 104 receives image data from the PD unit 107, receives the user setting (setting value) from the image capturing controller 102, and decides image capturing conditions of a next frame and subsequent frames.

Next, the image capturing condition decision unit 104 which decides an image capturing condition for acquiring an unrecognizable image or a hardly recognizable image will be described in detail.

The image capturing condition decision unit 104 includes a luminance distribution generation unit 200 for generating a luminance distribution, an image capturing condition calculation unit 201 for calculating an image capturing condition according to the luminance distribution and the user setting, and an image capturing condition addition unit 202 for adding the image capturing conditions of the interior and the exterior of the protection area. The image capturing condition calculation unit 201 includes an extra-protection area image capturing condition calculation unit 203 (hereinafter, referred to as "extra-protection area calculation unit 203") and an intra-protection area image capturing condition calculation unit 204 (hereinafter, referred to as "intra-protection area calculation unit 204").

The luminance distribution generation unit 200 receives image data acquired by the PD unit 107 and generates a luminance distribution from the image data. According to the protection area set by the user, the luminance distribution generation unit 200 divides the generated luminance distribution into luminance distribution information of the interior of the protection area and luminance distribution information of the exterior of the protection area. The luminance distribution generation unit 200 then transmits the luminance distribution information of the interior of the protection area to the intra-protection area calculation unit 204, and transmits the luminance distribution information of the exterior of the protection area to the extra-protection area calculation unit 203. Each of the intra-protection area calculation unit 204 and the extra-protection area calculation unit 203 then calculates the image capturing condition for each of the areas. The intra-protection area calculation unit 204 and the extra-protection area calculation unit 203 transmit the calculated image capturing conditions to the image capturing condition addition unit 202. The image capturing condition addition unit 202 adds the received image capturing conditions.

The extra-protection area calculation unit 203 receives luminance distribution information of the areas excluding the set protection area from the luminance distribution generation unit 200, and determines whether image capturing is executed under an image capturing condition appropriate for each of the areas.

A range of the protection area is set by the interface 101 via the image capturing controller 102. If it is determined that image capturing has not been executed under the appropriate image capturing condition because of change of the luminance distribution caused by, for example, change of brightness of the illumination in the room, the extra-protection area calculation unit 203 calculates an appropriate image capturing condition. The extra-protection area calculation unit 203 may also have a function of calculating an image capturing condition by detecting a dynamic area from the acquired image data and predicting subsequent luminance change.

The intra-protection area calculation unit 204 receives the luminance distribution information of the interior of the protection area (privacy area) from the luminance distribution generation unit 200. The intra-protection area calculation unit 204 receives setting values of two thresholds, which are used as references when the image capturing condition is calculated, from the interface 101 via the image capturing controller 102. The two thresholds include a threshold that is to be compared with a tail width of a luminance distribution curve (hereinafter, referred to as "tail width threshold") and a threshold that is to be compared with a peak value of the luminance distribution curve (hereinafter, referred to as "peak threshold"). The intra-protection area calculation unit 204 also receives a setting value of a parameter for deciding whether to execute Gaussian Fitting from the interface 101 via the image capturing controller 102. The above-described setting values are set to the intra-protection area calculation unit 204. The peak threshold is a predetermined value concerning the maximum luminance value.

Respective function units of the image capturing sensor unit 103 (e.g., the analog gain control unit 105, the exposure time control unit 106, the luminance distribution generation unit 200, the image capturing condition addition unit 202, the extra-protection area calculation unit 203, and the intra-protection area calculation unit 204) are mounted on the image capturing apparatus 100 as dedicated software or dedicated hardware, such as an application specific integrated circuit (ASIC) or a programmable logic array (PLA). In a case where these function units are mounted as hardware, the function units may be mounted as dedicated hardware modules, each of which is configured of one or more of these function units. In a case where the function units are mounted as software, a program for executing each of the function units is stored in a memory (not illustrated), and the program is read and executed by a processor (not illustrated) as appropriate.

A method for calculating an image capturing condition executed by the intra-protection area calculation unit 204 will now be described with reference to FIGS. 2, 3, and 4A to 4D.

Figure 2:
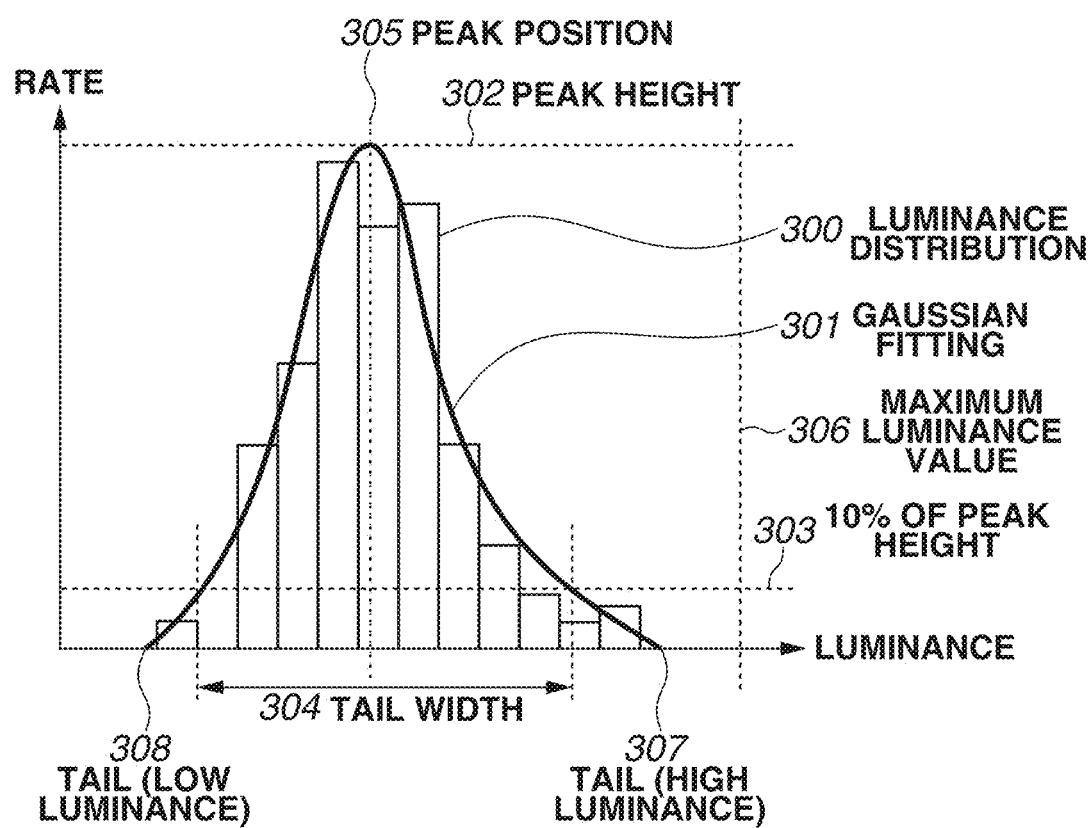
FIG. 2 is a luminance distribution chart used for calculating an image capturing condition according to the first exemplary embodiment.

FIG. 2 illustrates a luminance distribution 300 the intra-protection calculation unit 204 receives from the luminance distribution generation unit 200. The luminance distribution 300 is a bar chart before a luminance distribution curve is created through Gaussian Fitting, which illustrates luminance of the interior of the protection area.

The intra-protection area calculation unit 204 executes function processing of the Gaussian Fitting 301 based on a parameter for deciding whether to execute Gaussian Fitting on the luminance distribution 300. The intra-protection area calculation unit 204 does not execute function processing depending on the parameter for deciding whether to execute Gaussian Fitting. The function processing does not always have to be Gaussian Fitting.

When the function processing of the Gaussian Fitting 301 is executed, the intra-protection area calculation unit 204 acquires (extracts) information about a peak height 302 of a fitting function (luminance distribution curve). The peak height 302 represents the luminance value at which the pixel distribution of the image data is maximum. The intra-protection area calculation unit 204 further acquires information about a tail width 304 and a peak position 305 of the fitting function which can be acquired at a position (height) 303 corresponding to 10% of the peak height 302. The intra-protection area calculation unit 204 further acquires the maximum luminance value 306 and information about tails 307 and 308 of the fitting function. The tails 307 and 308 represents luminance at a peak height of 0% of the fitting function. The tail 307 is a tail at which luminance is high, and the tail 308 is a tail at which luminance is low. Based on the above-described pieces of information and a tail width threshold and a peak threshold set by the user, the intra-protection area calculation unit 204 calculates an image capturing condition in which the image data within the protection area is unrecognizable or hardly recognizable. With respect to 8-bit image data, the maximum luminance value 306 is 255. In the below-described exemplary embodiment, the tail 307 may be referred to as a "right tail", and the tail 308 may be referred to as a "left tail".

The image capturing condition in which the image data within the protection area is unrecognizable or hardly recognizable refers to an image capturing condition in which luminance values (pixel values) of pixels of image data within the protection area fall within a predetermined range. The image capturing condition refers to, for example, an image capturing condition in which luminance values of all of the pixels within the protection area fall within the neighborhood of the minimum value (underexposed state) or within the neighborhood of the maximum value (overexposed state).

FIG. 3 is a flowchart illustrating processing for calculating the image capturing condition in which image data within the protection area is unrecognizable or hardly recognizable, the processing being executed by the intra-protection area calculation unit 204.

In S400, the PD unit 107 acquires image data by executing image capturing.

In S401, the luminance distribution generation unit 200 receives the image data acquired by the PD unit 107 from the PD unit 107 and generates a luminance distribution.

In S402, the intra-protection area calculation unit 204 receives luminance distribution information of the protection area from the luminance distribution generation unit 200. The intra-protection area calculation unit 204 also receives from the image capturing controller 102 a tail width threshold (setting value) and a peak threshold (setting value) used for calculating the image capturing condition, and further receives a parameter (setting value) for deciding whether to execute Gaussian Fitting.

In S403, based on the image capturing condition applied when the image is acquired by the PD unit 107, the intra-protection area calculation unit 204 shifts the luminance distribution received from the luminance distribution generation unit 200. This shifting is executed to prevent the occurrence of a problem in which the image capturing condition calculated from the received luminance distribution information cannot be used as the image capturing condition in which the image data within the protection area is unrecognizable or hardly recognizable. For example, this problem occurs when the image capturing condition of the interior of the protection area is calculated with respect to the image data acquired under the image capturing condition in which the exposure time and the analog gain value of the interior of the protection area are maximized. In this case, even if the image capturing condition in which the exposure time and the analog gain value are increased is calculated, the calculation result cannot be used as the image capturing condition. Thus, by shifting the luminance distribution based on the image capturing condition applied when the image is captured, a calculation result can be used as the image capturing condition. In addition, there is also a case where the luminance distribution is not be shifted in S403 because shifting of the luminance distribution in S403 is executed based on the image capturing condition applied when the image is acquired by the PD unit 107.

In S404, the intra-protection area calculation unit 204 refers to the set parameter for deciding whether to execute Gaussian Fitting, which has been received through the interface 101 via the image capturing controller 102, and decides (determines) whether to execute Gaussian Fitting. If Gaussian Fitting is to be executed (YES in S404), the processing proceeds to S405. If Gaussian Fitting is not executed (NO in S404), the processing proceeds to S406.

In S405, the intra-protection area calculation unit 204 executes Gaussian Fitting processing on the received luminance distribution, and extracts the information (e.g., peak height 302) used for calculating the image capturing condition.

In S406, the intra-protection area calculation unit 204 calculates a height 303 corresponding to 10% of the peak height 302 using the peak height 302 acquired through the Gaussian Fitting processing. Then, the intra-protection area calculation unit 204 compares a width (tail width 304) of the height 303 with the tail width threshold set by the user via the interface 101. More specifically, the intra-protection area calculation unit 204 determines whether the tail width 304 is greater than the tail width threshold (i.e., setting value). The tail width threshold can also be called a predetermined range of the luminance values of the pixels.

When the tail width 304 is the tail width threshold or less (NO in S406), the luminance values of the pixels of the image data within the protection area fall within the predetermined range (i.e., predetermined luminance range). This indicates that the image data within the protection area is unrecognizable or hardly recognizable. In this case, the image capturing condition is not changed, so that the processing proceeds to S410. For example, the above-described state corresponds to a state illustrated in FIG. 4B described below.

In contrast, when the tail width 304 of the fitting function is greater than the tail width threshold (YES in S406), the luminance values of the pixels of the image data within the protection area do not fall within the predetermined luminance range. This indicates that the image data within the protection area is recognizable. In this case, the intra-protection area calculation unit 204 advances the processing to S407 to S409 to calculate and set the image capturing condition in which the image data within the protection area is unrecognizable or hardly recognizable.

In S407, the intra-protection area calculation unit 204 compares the peak position 305 acquired through the Gaussian Fitting processing with the set peak threshold (setting value). More specifically, the intra-protection area calculation unit 204 determines whether the peak position 305 is greater than the peak threshold set by the user via the interface 101. If the determination result acquired in S407 is "YES", the processing proceeds to S408. If the determination result acquired in S407 is "NO", the processing proceeds to S409.

In S408, the intra-protection area calculation unit 204 sets (updates) the image capturing condition so that the luminance distribution is concentrated to the right tail 307 (high luminance) of the fitting function. The intra-protection area calculation unit 204 then transmits the set image capturing condition to the image capturing condition addition unit 202. In a case where the luminance value of the right tail 307 is greater than the maximum luminance value 306, the intra-protection area calculation unit 204 updates the image capturing condition by which the luminance distribution is concentrated to the maximum luminance value 306 or values in its neighborhood.

In S409, the intra-protection area calculation unit 204 sets (updates) the image capturing condition so that the luminance distribution is concentrated to the left tail 308 (low luminance) of the fitting function. The intra-protection area calculation unit 204 then transmits the set image capturing condition to the image capturing condition addition unit 202. In a case where the luminance value of the left tail 308 is less than 0, the intra-protection area calculation unit 204 updates the image capturing condition by which the luminance distribution is concentrated to the luminance value of 0 or values in its neighborhood.

In S410, the image capturing condition addition unit 202 adds the image capturing conditions of the interior and the exterior of the protection area calculated by the image capturing condition calculation unit 201 to acquire the image capturing condition of the entire image (unification of the image capturing conditions). With respect to the initial image capturing condition, the image capturing condition may be set by the user via the interface 101 because captured image data has not been input thereto.

In S411, from among the image capturing conditions calculated by the image capturing condition decision unit 104, the analog gain value and the exposure time are respectively transmitted and applied to the analog gain control unit 105 and the exposure time control unit 106. For example, in a case where an image of the protection area (privacy area) is to be overexposed, the exposure time control unit 106 lengthens the exposure time when the PD unit 107 captures an object image. Alternatively, the analog gain control unit 105 reduces the gain when the PD unit 107 captures an object image, so that an image of the protection area can be overexposed. Furthermore, the exposure time control unit 106 lengthens the exposure time and the analog gain control unit 105 reduces the gain when the PD unit 107 captures an object image, so that an image of the protection area can also be overexposed.

In a case where an image of the protection area is to be underexposed, for example, the exposure time control unit 106 shortens the exposure time when the PD unit 107 captures the object image. Alternatively, the analog gain control unit 105 increases the gain when the PD unit 107 captures the object image, so that an image of the protection area can be underexposed. Furthermore, the exposure time control unit 106 shortens the exposure time and the analog gain control unit 105 increases the gain when the PD unit 107 captures the object image, so that an image of the protection area can also be underexposed.

In S412, the image capturing controller 102 determines whether an instruction for ending the processing is transmitted from the user. When a determination result is "NO" (NO in S412), the processing returns to S400. In a case where the instruction for ending the processing is transmitted (YES in S412), the image capturing sensor unit 103 ends the processing illustrated in FIG. 3.

FIGS. 4A to 4D illustrate diagrams of image examples acquired by the image capturing apparatus 100 when a protection area is set within the image capturing area of the PD unit 107, and the image capturing condition is set for each of the areas through a method according to the present exemplary embodiment. In FIGS. 4A to 4D, persons X, Y, and Z are captured as object images.

Figure 4A:
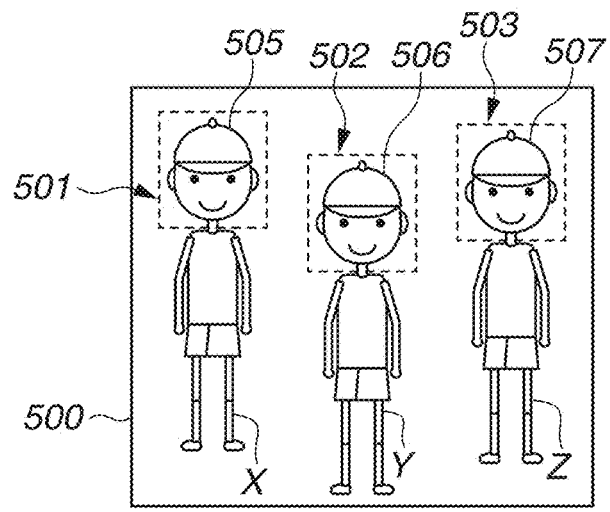
FIGS. 4A to 4D illustrate images acquired by the image capturing apparatus according to the first exemplary embodiment.

FIG. 4A illustrates an image 500 acquired before or immediately after the protection area is set thereto.

Protection areas 501, 502, and 503 are specified (set) by the user. In the image 500 of FIG. 4A, the protection areas 501, 502, and 503 are set to include face regions (facial contours) of the persons X, Y, and Z from a viewpoint of protecting privacy of the persons X, Y, and Z. In a state illustrated in FIG. 4A, face images 505, 506, and 507 of the objects X, Y, and Z within the protection areas 501, 502 and 503 are recognizable, respectively. In the present exemplary embodiment, each of the objects X, Y, Z wears a cap, and thus the "object's face" and the "face contour" include a cap.

Figure 4B:
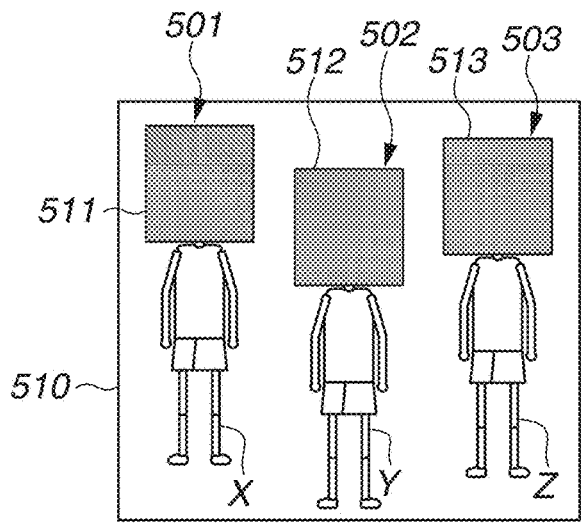

By employing the method according to the first exemplary embodiment, an image capturing condition is calculated based on the image data of the protection areas 501, 502 and 503, and the calculated image capturing condition is applied to the image 500 in FIG. 4A. As a result, an image 510 illustrated in FIG. 4B can be acquired. Images 511, 512, and 513 in FIG. 4B are images of the protection areas 501, 502 and 503. As a result of controlling the image capturing conditions of the interiors of the protection areas 501, 502 and 503, the faces of the objects X, Y, and Z within the protection areas 501, 502 and 503 are unrecognizable or hardly recognizable.

Thereafter, image capturing is continuously executed by the image capturing apparatus 100. In other words, it is assumed that monitoring of the person X, Y, and Z is executed continuously while privacy protection of the image data acquired by the PD unit 107 is executed through the method according to the first exemplary embodiment.

If dispersion of the luminance distributions within the protection areas 501, 502 and 503 is included in the tail width threshold (setting value), image data within the protection areas 501, 502 and 503 is unrecognizable or hardly recognizable, so that the image capturing apparatus 100 does not change the image capturing condition.

Figure 4C:
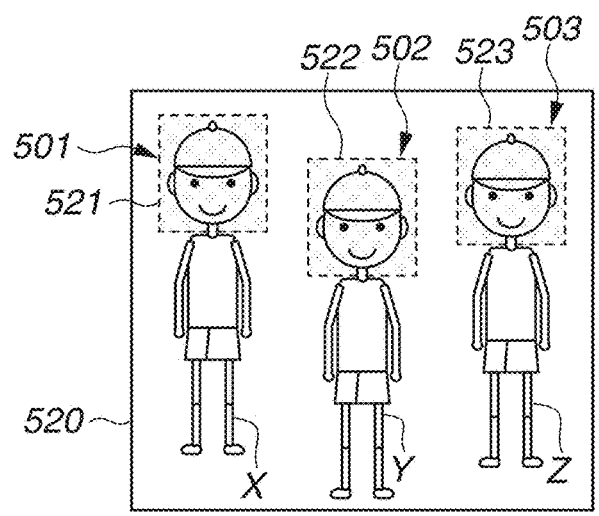

If dispersion of the luminance distributions within the protection areas 501, 502 and 503 is not included in the tail width threshold, the image capturing condition needs to be changed (set again). An image 520 in FIG. 4C is an example of the image when the image capturing condition needs to be changed. For example, in a case where the illumination of the room becomes brighter than that of FIG. 4B, face images 521, 522, and 523 within the protection areas 501, 502 and 503 are recognizable as illustrated in FIG. 4C. In this case, the image capturing condition in which the face images 521, 522 and 523 within the protection areas 501, 502 and 503 are unrecognizable or hardly recognizable is calculated through the method described in the first exemplary embodiment, so that the image capturing condition is changed (updated), accordingly.

Figure 4D:
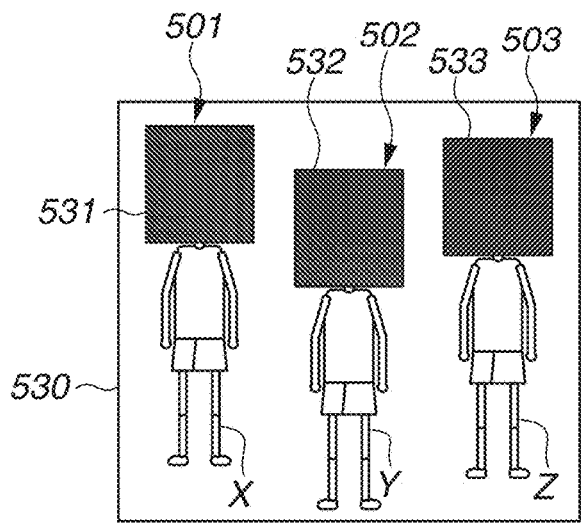

An image 530 in FIG. 4D is acquired when the images of the objects X, Y, and Z are captured by the PD unit 107 after the image capturing condition of the image 520 in FIG. 4C is updated through the method according to the first exemplary embodiment. By updating the image capturing conditions of the protection areas 501, 502 and 503, the face images 521, 522 and 523 which can be recognized in FIG. 4C are unrecognizable or hardly recognizable in the protection areas 501 to 503, as illustrated in the images 531, 532, and 533 in FIG. 4D.

According to the present exemplary embodiment, image data that is unrecognizable or hardly recognizable in a predetermined area (protection area) can therefore be acquired by the image capturing sensor unit 103 capable of acquiring image data under a different image capturing condition for each area. It is thereby possible to acquire high-security image data when image capturing is executed. According to the image capturing apparatus 100 of the present exemplary embodiment, it is possible to protect privacy with high security because the privacy protection processing has already been executed on the acquired image data when the image data is acquired (i.e., when image capturing is executed).

In the present exemplary embodiment, determination in S407 is executed when the determination result acquired in S406 is "YES", and the processing proceeds to S408 or S409 based on the determination result acquired in S407. However, the processing may proceed to S408 or S409 without executing determination in S407 when the determination result acquired in S406 is "YES".

Alternatively, although the protection areas are set to include all the faces of the persons X, Y, and Z, protection areas may be set to include only a face of a specific person (i.e., person X, Y, or Z) or faces of persons X and Y (or persons X and Z or persons Y and Z).

The image capturing apparatus 100 may be an apparatus other than the monitoring camera. Examples of the apparatus include a network camera, a digital camera, a camera module mounted on a smartphone, and a camera module mounted on a tablet terminal.

In a case where a graphical user interface (GUI), such as a touch panel, is used as the interface 101, the interface 101 may be separated from the image capturing apparatus 100.

Figure 5:
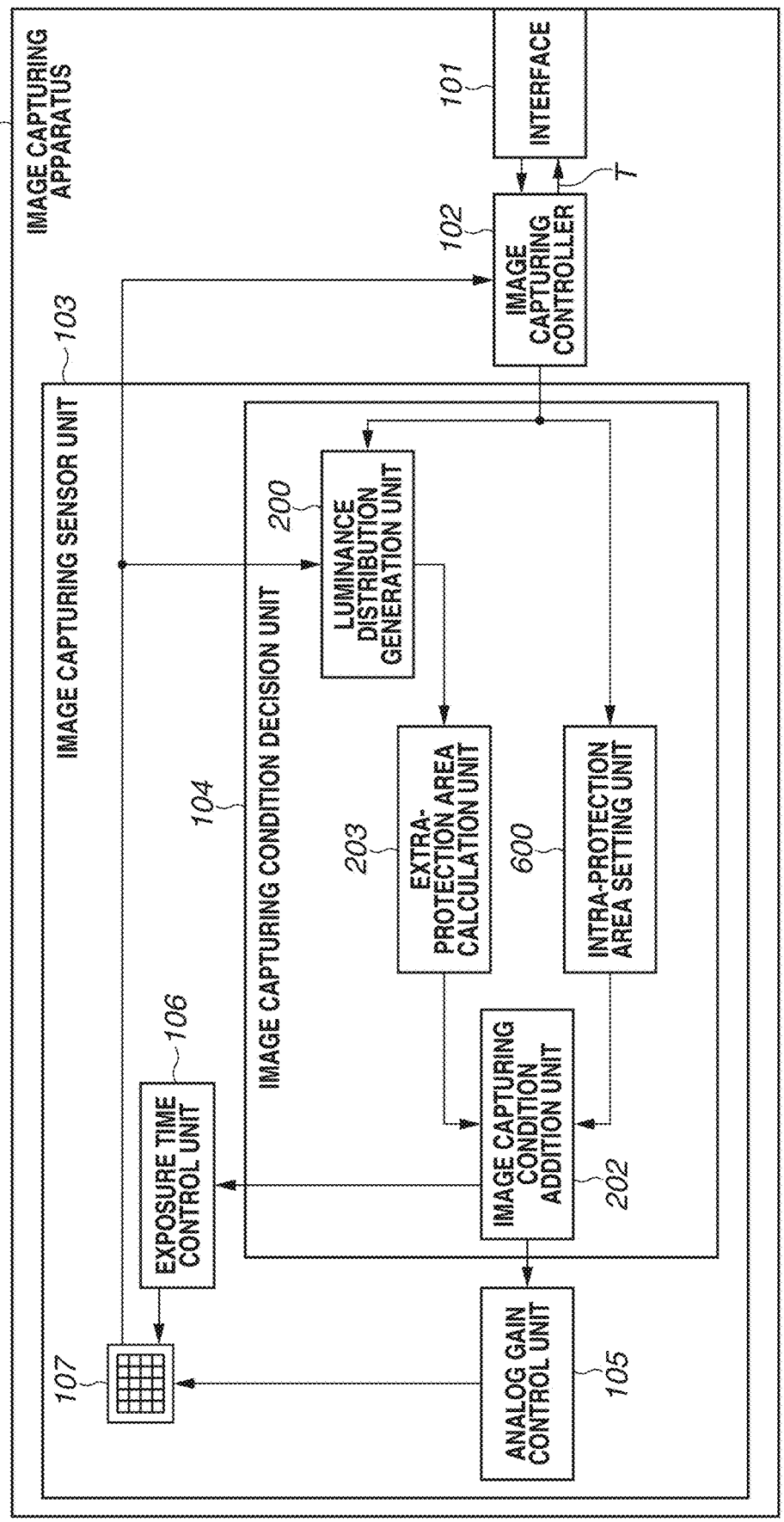
FIG. 5 illustrates a block diagram of a schematic configuration example of an image capturing apparatus according to a second exemplary embodiment.

An image capturing apparatus 100A according to a second exemplary embodiment will now be described with reference to FIG. 5. The same reference numeral is applied to a constituent element similar to that of the image capturing apparatus 100 of the first exemplary embodiment illustrated in FIG. 1.

A configuration of the image capturing apparatus 100A is basically the same as the configuration of the image capturing apparatus 100, except that the image capturing apparatus 100A includes an intra-protection area image capturing condition setting unit 600 (hereinafter, referred to as "intra-protection area setting unit 600") and does not include the intra-protection area calculation unit 204. The image capturing apparatus 100A includes only the extra-protection area calculation unit 203 as an image capturing condition calculation unit. The image capturing apparatus 100A can also transmit information from the image capturing controller 102 to the interface 101 as indicated by an arrow T.

In the present exemplary embodiment, the interface 101 of the image capturing apparatus 100A receives from the user not only a range of the protection area but also the image capturing condition of the interior of the protection area. The image capturing condition decision unit 104 receives the acquired image data from the PD unit 107, and receives from the user via the interface 101 a setting value with respect to the range of the protection area. The extra-protection area calculation unit 203 receives the range of the protection area from the interface 101 via the image capturing controller 102, and receives a luminance distribution from the luminance distribution generation unit 200. The intra-protection area setting unit 600 receives the range of the protection area and the setting value of the image capturing condition of the interior of the protection area from the interface 101 via the image capturing controller 102.

A method for setting the image capturing conditions of the interior and the exterior of the protection area will now be described. The image capturing condition of the exterior of the protection area is calculated by the extra-protection area calculation unit 203 based on the luminance distribution received from the luminance distribution generation unit 200. The image capturing condition of the interior of the protection area is set to the intra-protection area setting unit 600 by the user via the interface 101. Thereafter, the image capturing conditions of the interior and the exterior of the protection area are added by the image capturing condition addition unit 202.

The image capturing controller 102 according to the present exemplary embodiment determines whether a face image within the protection area is recognizable in the image data acquired under the image capturing condition added by the image capturing condition addition unit 202. In other words, the image capturing controller 102 determines whether the privacy of the object can be protected by the image capturing condition received by the interface 101. This determination is executed based on the luminance distribution of the image data.

In a case where the face image within the protection area of the image data acquired under the image capturing condition added by the image capturing condition addition unit 202 is recognizable, the image capturing apparatus 100A notifies the user that the face image is recognizable. This notification is transmitted to the user from the image capturing controller 102 via the interface 101 (indicated by an arrow T). In other words, if it is determined that the privacy of the object cannot be protected by the image capturing condition received by the interface 101, the image capturing controller 102 outputs the information indicating that privacy protection cannot be executed, to the outside via the interface 101.

The image capturing apparatus 100A may include an output unit (e.g., an image display unit, a speaker, or a light-emitting unit) which outputs an image, characters, sound, or light. Instead of (or in addition to) transmitting the notification indicated by the arrow T to the user, the image capturing apparatus 100A may output, from the output unit, an alert image that illustrates the content similar to that of the notification. When a GUI is used as the interface 101, the above-described output unit may be included in the interface 101.

The image capturing apparatus 100A may not have the function for determining whether a face image within the protection area is recognizable in the image data acquired under the image capturing condition added by the image capturing condition addition unit 202. In this case, the notification indicated by the arrow T is not transmitted to the user.

Similarly to the image capturing apparatus 100 according to the first exemplary embodiment, the image capturing apparatus 100A according to the present exemplary embodiment can acquire image data unrecognizable or hardly recognizable in the protection area through the image capturing sensor unit 103 capable of acquiring image data under a different image capturing condition for each area. It is thereby possible to acquire high-security image data when image capturing is executed.

A third exemplary embodiment will be now described with reference to FIGS. 1 and 6.

A configuration of an image capturing apparatus according to the present exemplary embodiment is similar to that of the image capturing apparatus 100 described in the first exemplary embodiment, and thus the block diagram illustrated in FIG. 1 will be referred to the configuration of the image capturing apparatus. In the present exemplary embodiment, the image capturing condition decision unit 104 receives a setting of the image capturing condition of the interior of the protection area from the interface 101 via the image capturing controller 102.

Figure 6:
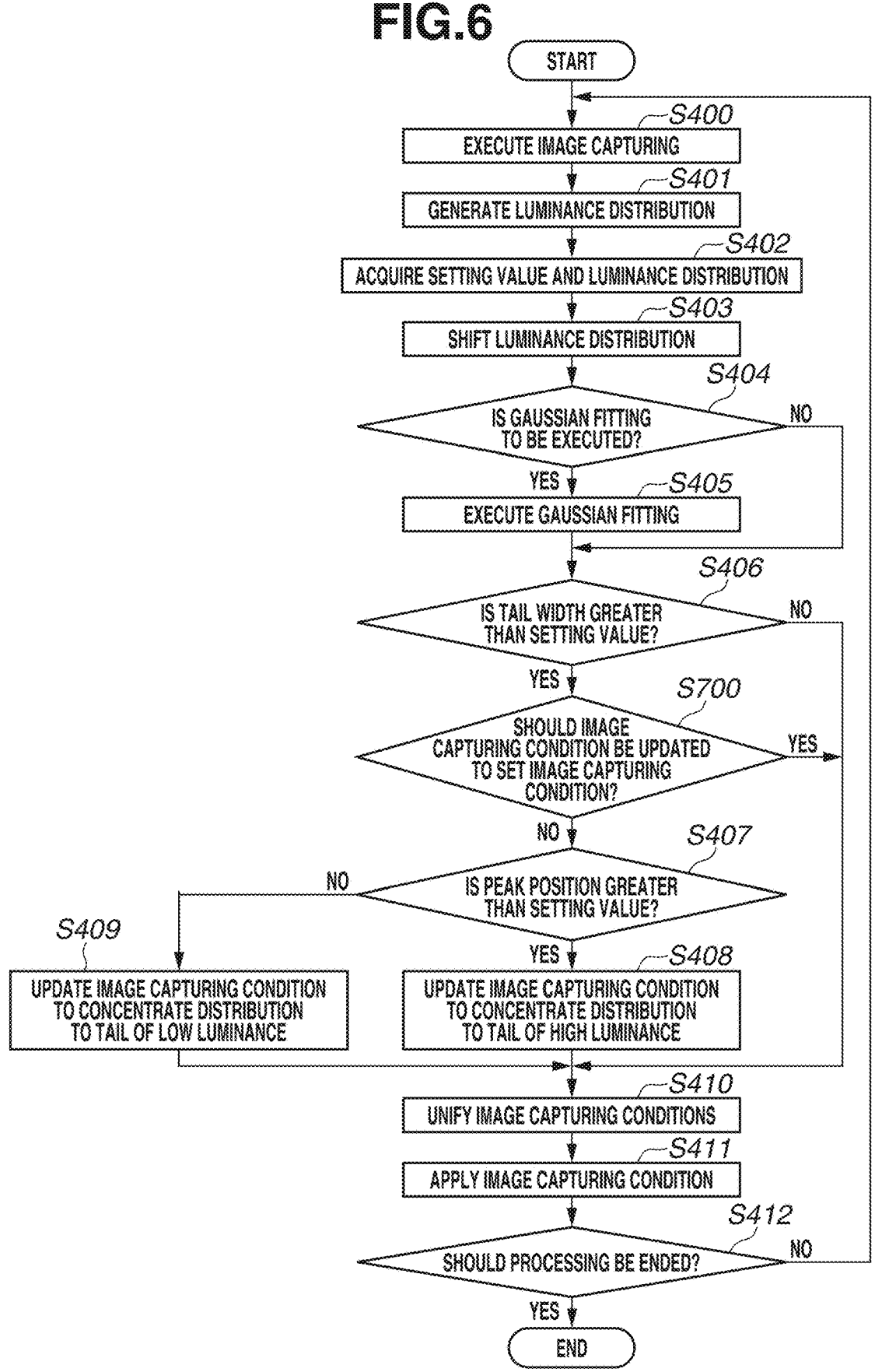
FIG. 6 illustrates a flowchart of processing for calculating an image capturing condition according to a third exemplary embodiment.

FIG. 6 illustrates a flowchart of processing for deciding (calculating) an image capturing condition of the interior of the protection area according to the present exemplary embodiment. The same reference numerals (i.e., S400, S401, and S412) are applied to the processing similar to the processing illustrated in the flowchart of FIG. 3. The processing in S400 to S406 in FIG. 6 is similar to that of FIG. 3.

In the present exemplary embodiment, if the determination result in S406 is "YES", the processing proceeds to S700.

In S700, the intra-protection area calculation unit 204 determines whether to set the image capturing conditions set through the interface 101 via the image capturing controller 102 as the image capturing conditions, in the interiors of the protection areas 501, 502, and 503. Specifically, the intra-protection area calculation unit 204 determines whether face images within the protection areas 501, 502 and 503 are unrecognizable or hardly recognizable when image capturing is executed under the set image capturing conditions, and decides whether to update the image capturing conditions to the image capturing conditions set through the interface 101 via the image capturing controller 102. If the image data within the protection areas 501, 502, and 503 is unrecognizable or hardly recognizable (YES in S700), processing proceeds to S410 so that the image capturing conditions is updated to the set image capturing conditions. The processing in S410 to S412 is similar to the processing illustrated in FIG. 3. The intra-protection area calculation unit 204 according to the present exemplary embodiment also decides the image capturing condition in addition to calculation of the image capturing condition, and therefore the intra-protection area calculation unit 204 may be referred to as an "intra-protection area image capturing condition decision unit".

In contrast, if image data within the protection areas 501, 502, and 503 is recognizable (NO in S700), the intra-protection area calculation unit 204 does not update the image capturing conditions to the set image capturing conditions, and processing proceeds to S407 to calculate the image capturing conditions which causes the image data within the protection areas 501, 502, and 503 to be unrecognizable or hardly recognizable. The processing in S407 to S412 is similar to the processing illustrated in FIG. 3.

According to the present exemplary embodiment, similarly to the first exemplary embodiment, image data that is unrecognizable or hardly recognizable in the protection area can therefore be acquired by the image capturing sensor unit 103 capable of acquiring image data under a different image capturing condition for each area. It is thereby possible to acquire high-security image data when image capturing is executed.

<Configuration of Image Capturing System>

Figure 7:
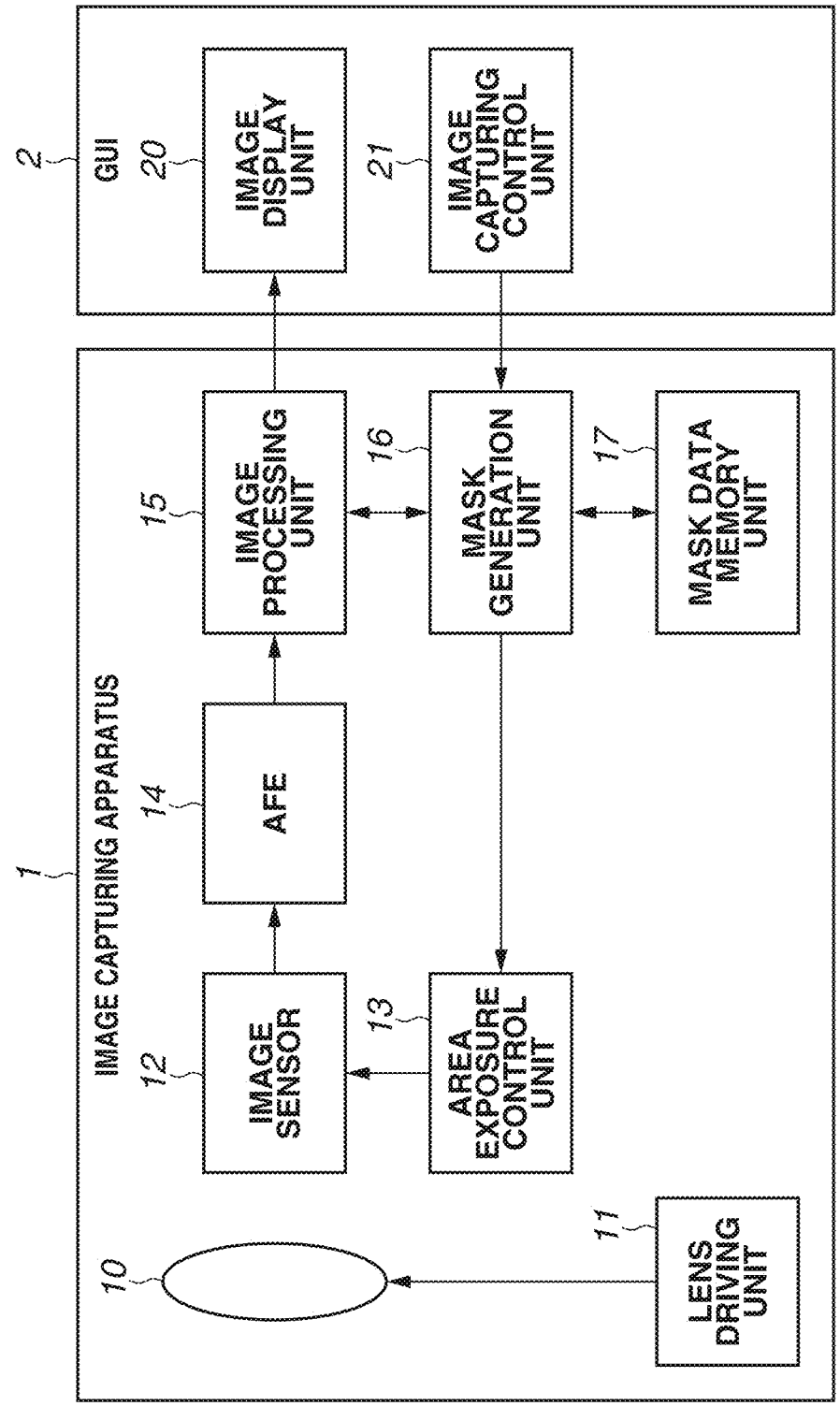
FIG. 7 illustrates a block diagram of a configuration example of an image capturing system according to a fourth exemplary embodiment.

FIG. 7 is a block diagram illustrating a configuration example of an image capturing system according to a fourth exemplary embodiment.

The image capturing system includes an image capturing apparatus 1 and a graphical user interface (GUI) 2. The image capturing apparatus 1 captures an image of the area set by the user. The GUI 2 is executed by an information processing apparatus, such as a personal computer, to execute display of information and acceptance of an instruction input by the user.

The image capturing apparatus 1 includes an image capturing lens 10 configured to condense incident light to form an image, a lens driving unit 11 configured to change a zoom magnification of the image capturing lens 10, an image sensor 12 configured to convert the formed image into an analog image signal, and an area exposure control unit 13 configured to execute setting of the exposure condition of the image sensor 12.

The image capturing apparatus 1 further includes an analog front end (AFE) 14 and an image processing unit 15. The AFE 14 is configured to amplify an image signal output from the image sensor 12 and remove noise therefrom. The image processing unit 15 is configured to execute various types of image processing on the image data output from the AFE 14.

The image capturing apparatus 1 further includes a mask generation unit 16 and a mask data memory unit 17. The mask generation unit 16 is configured to generate a mask based on setting information (coordinate position) of a privacy area set by an image capturing control unit 21. The mask data memory unit 17 is configured to store the setting information of the mask generated by the mask generation unit 16.

The GUI 2 includes an image display unit 20 configured to display an image output from the image processing unit 15 and the image capturing control unit 21 configured to set a privacy area of the image capturing apparatus 1 and change an image capturing area (i.e., field of view). The user is allowed to set a privacy area in the image through the image capturing control unit 21 to execute masking processing on the privacy area and to check a result of the mask set thereto through the image display unit 20.

The image capturing lens (image capturing optical system) 10 of the image capturing apparatus 1 includes a focus lens and a zoom lens for condensing incident light to form an image.

The lens driving unit 11 drives the zoom lens of the image capturing lens 10 to change a zoom magnification.

The image sensor 12 photoelectrically converts an object image (optical image) acquired via the image capturing lens 10 and outputs an image signal. The image sensor 12 sets the exposure conditions, such as exposure times and analog gains, for each of predetermined image capturing areas (i.e., each of or a plurality of pixels). Hereinafter, an area consisting of or configured of a single pixel or a plurality of pixels, where exposure conditions are controlled simultaneously, will be referred to as a uniform exposure area.

The area exposure control unit 13 controls exposure by setting the exposure condition of each of the uniform exposure areas of the image sensor 12. For example, an image will be brighter if the amount of light taken into the uniform exposure area is increased by lengthening the exposure time of the uniform exposure area. In contrast, an image will be darker if the amount of light taken into the uniform exposure area is decreased by shortening the exposure time. Typically, when image capturing is executed, the exposure condition for applying optimum exposure is applied for each of the pixel areas depending on the luminance value in order to improve visibility of the object. In the present exemplary embodiment, a concealing-target area (e.g., privacy area) is set as a uniform exposure area. Then, masking processing is executed in such a way that exposure is controlled by excessively lengthening or shortening the exposure time, so that image data in the concealing-target area is brought into a so-called overexposed state or underexposed state.

The AFE 14 includes an analog circuit configured to amplify an image signal output from the image sensor 12 and remove amplification noise and reset noise included in the image signal. The AFE 14 further includes an analog-to-digital (A/D) conversion unit configured to convert an analog signal (image signal) into a digital signal after predetermined analog processing is executed thereon.

The image processing unit 15 executes various types of image processing on a digital signal (image data) transmitted from the AFE 14 and outputs the digital signal.

The mask generation unit 16 generates a mask based on the setting information (coordinate position) of the privacy area set by the image capturing control unit 21.

The mask data memory unit 17 stores setting information of the mask generated by the mask generation unit 16. The mask data memory unit 17 is configured of a non-volatile memory device, such as a Flash read only memory (ROM). If the image capturing apparatus 1 includes the mask data memory unit 17, setting information of the mask can be stored in the image capturing apparatus 1. The user can request the lens driving unit 11 to drive the image capturing lens 10 by executing an operation for changing a field of view through the image capturing control unit 21, thereby being able to change the image capturing area of the image capturing apparatus 1.

In the above-described exemplary embodiment, a field of view is changed by driving the image capturing lens 10 for the purpose of description. However, the field of view can also be changed by controlling a driving mechanism (not illustrated) for panning or tilting the image capturing apparatus 1. Although the area exposure control unit 13, the image processing unit 15, and the mask generation unit 16 have been described separately, these units may be included in a single CPU.

<Mask Setting Processing>

Figure 9A:
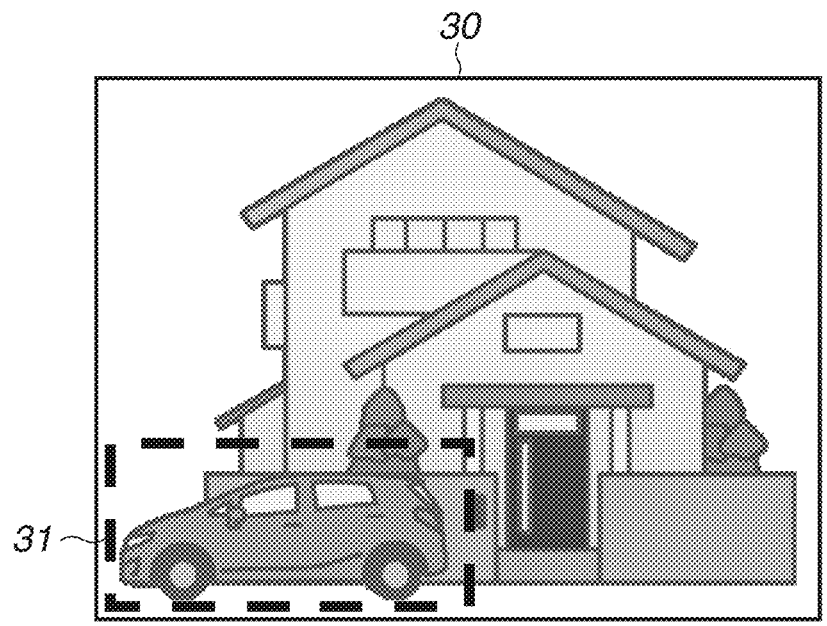
FIGS. 9A and 9B illustrate examples of a captured image before and after executing masking processing.
Figure 9B:
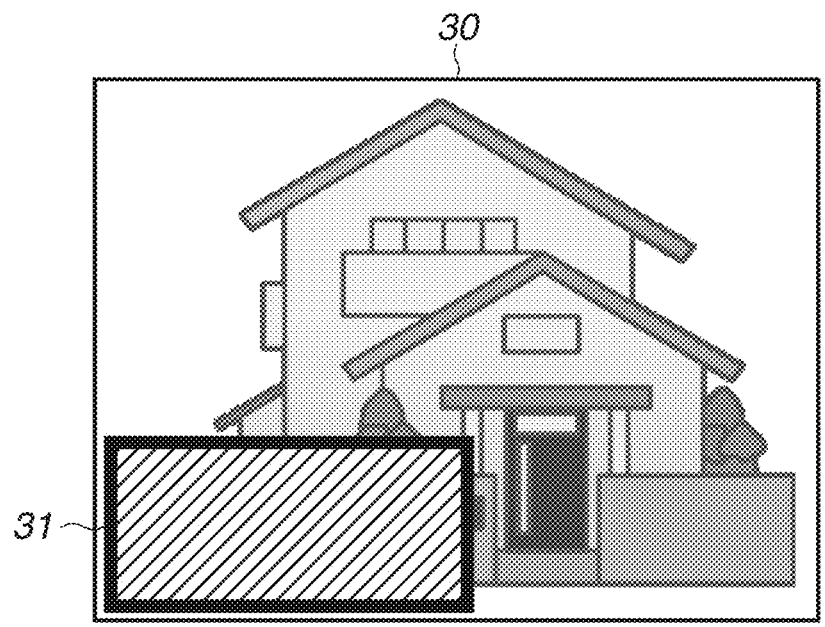

FIG. 8 is a flowchart of an example of mask setting processing. FIGS. 9A and 9B are diagrams illustrating examples of images captured by the image capturing apparatus 1 and displayed on the GUI 2. FIG. 9A illustrates an example of an image before masking processing is executed, and FIG. 9B illustrates an example of the image after masking processing is executed.

Hereinafter, an example of the processing for setting a privacy area will be described with reference to FIGS. 8, 9A, and 9B.

After the processing in FIG. 8 starts, in S1, the user sets a privacy area (hereinafter, referred to as "mask setting area 31") on which the masking processing is to be executed in a captured image 30 (FIG. 9A) displayed on the image display unit 20 through the image capturing control unit 21 of the GUI 2. At this time, the user sets a position (coordinates) and a size of an area on which the masking processing is to be executed. In S2, the mask generation unit 16 receives a mask generation request from the image capturing control unit 21 and acquires luminance value information of the mask setting area 31 from the image processing unit 15. In S3, the mask generation unit 16 further determines whether the luminance value of the acquired mask setting area 31 is a certain value (predetermined threshold) or more.

If the luminance value is a certain value or more (YES in S3), the processing proceeds to S4. In S4, the mask generation unit 16 requests the area exposure control unit 13 to set a pixel of the image sensor 12 corresponding to the mask setting area 31 as a uniform exposure area. In order to overexpose the image in the set uniform exposure area, the mask generation unit 16 transmits a request for setting an exposure condition to have a brightness brighter than or equal to a predetermined value, e.g., to lengthen the exposure time (long-time exposure). In other words, the mask generation unit 16 controls the exposure for the uniform exposure area to be brighter than or equal to the predetermined value. In contrast, if the luminance value is less than or equal to a certain value (NO in S3), the processing proceeds to S5. In S5, in order to underexpose the mask setting area 31, the mask generation unit 16 transmits a request for setting an exposure condition to have a brightness darker than or equal to a predetermined value, e.g., a condition to shorten the exposure time for the uniform exposure area (short-time exposure). In other words, the mask generation unit 16 controls the exposure for the uniform exposure area to be darker than or equal to the predetermined value.

The exposure condition may be changed by changing the exposure gain (analog gain value) instead of changing the exposure time. Alternatively, the exposure condition may be changed by changing both the exposure time and the exposure gain.

By executing image capturing according to the exposure condition set as the above, image data in the mask setting area 31 is overexposed or underexposed, so that an image having the masked mask setting area 31 is displayed on the image display unit 20 as illustrated in FIG. 9B. In S6, the mask generation unit 16 stores the setting information (coordinate position) of the mask setting area 31 in the mask data memory unit 17, and ends the processing. Subsequent image capturing is executed by using the setting information of the mask setting area 31 stored in the mask data memory unit 17.

Through the above-described processing, image data of the area set as the privacy area has already been overexposed or underexposed at a time when the image data is received by the image processing unit 15, so that processing for superimposing a mask image may not be necessary to be executed. It is thus possible to reduce a processing load of the image processing unit 15. Further, since the image data of the mask setting area 31 supplied to the image processing unit 15 has already been overexposed or underexposed, security of the image data can be improved.

Further, in the above-described exemplary embodiment, overexposed image data or underexposed image data is acquired by determining the luminance value of the mask setting area 31. However, the present exemplary embodiment is not limited thereto, and exposure of the uniform exposure area corresponding to the privacy area may uniformly be set to long-time exposure or short-time exposure.

As described above, according to the present exemplary embodiment, it is possible to reduce a processing load when an image having a concealed privacy area in an image capturing area is to be generated.

In the above-described fourth exemplary embodiment, the masking processing for concealing the privacy area is executed by changing the exposure condition for the uniform exposure area. In a fifth exemplary embodiment, masking processing is executed through a combination of methods, e.g., a method for concealing the privacy area by changing the exposure condition for the uniform exposure area and a method for concealing the privacy area by superimposing a mask image. A configuration of the image capturing system and processing for changing the exposure condition of the uniform exposure area are similar to those described in the fourth exemplary embodiment. Thus, hereinafter, only the masking processing executed on the privacy area will be described.

<Mask Setting Processing>

The user executes setting of a privacy area through the image capturing control unit 21 of the GUI 2. The mask generation unit 16 executes masking processing on an image based on setting information of the privacy area.

At this time, the mask generation unit 16 can select a concealing method for each of the privacy areas from the following methods, i.e., (1) a method for concealing the privacy area by superimposing a mask image on the image data through the image processing unit 15, and (2) a method for concealing the privacy area by controlling the exposure time for the uniform exposure area of the image sensor 12 through the area exposure control unit 13.

In the former method (1), a processing load of the image processing unit 15 increases because the image processing unit 15 generates and superimposes a mask image on a place corresponding to the privacy area. Thus, the number of settable areas is limited. In contrast, in the latter method (2), image data is input to the image processing unit 15 after the masking processing has already been executed on the privacy area. Thus, the processing load is reduced because the image processing unit 15 does not superimpose a mask image. However, in a case where the image capturing area of the image capturing apparatus 1 is changed, the exposure time is changed after the privacy area is calculated again. As a result, there is a long time lag before the exposure time is changed. Thus, in comparison to the former method (1), a follow-up capability of following up a movement of the image capturing apparatus 1 (a change of the image capturing area) is poor. In the present exemplary embodiment, a mask type is therefor switched depending on whether the image capturing apparatus 1 is moved.

<Processing for Changing Mask Type>

Figure 10:
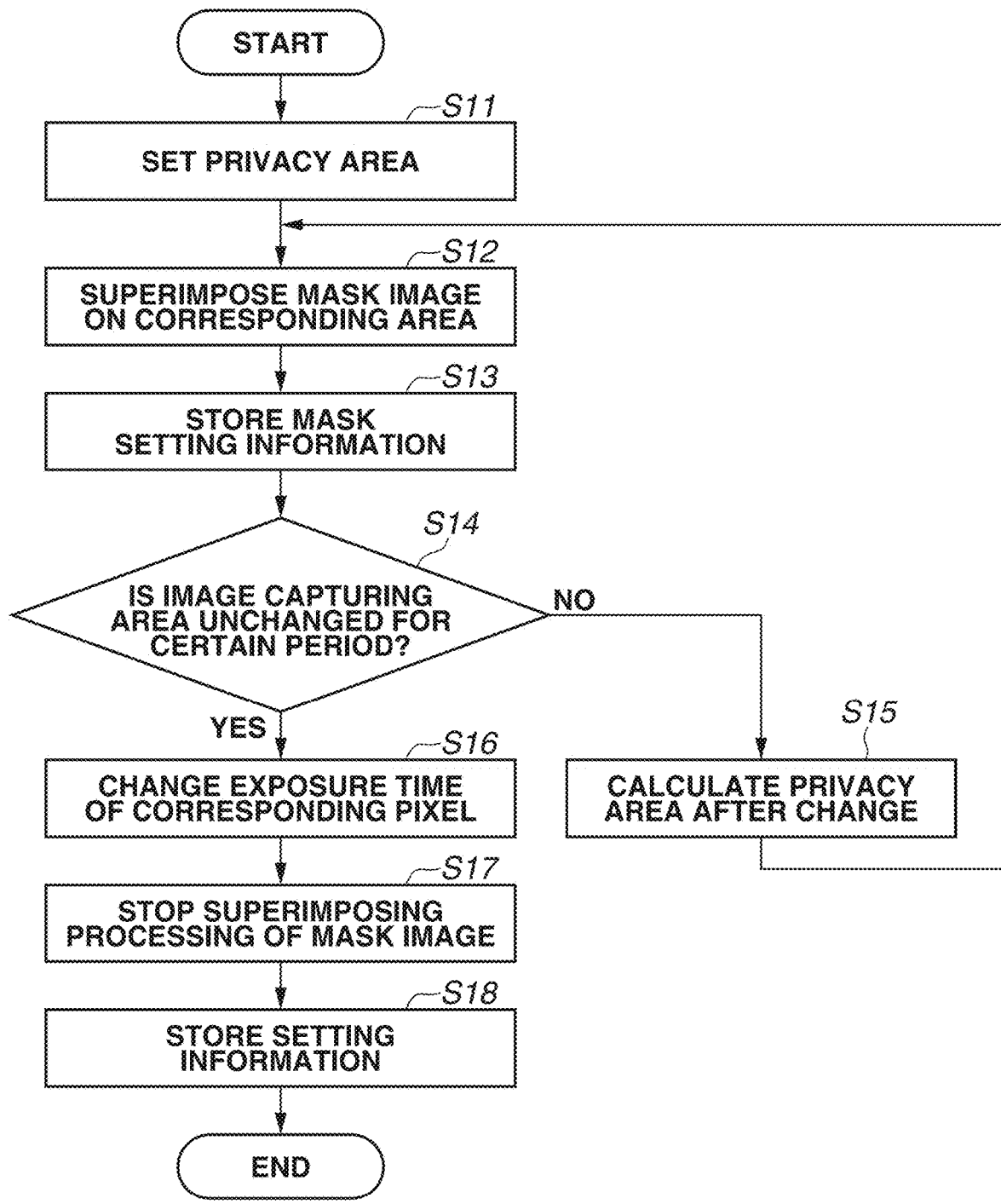
FIG. 10 illustrates a flowchart of an example of mask type changing processing according to a fifth exemplary embodiment.

FIG. 10 is a flowchart illustrating an example of processing for changing (switching) a mask type.

Hereinafter, processing will be described with respect to the case where a mask type is switched depending on whether the image capturing apparatus 1 is moved.

In S11, similarly to the above-described processing according to the fourth exemplary embodiment, the user sets a privacy area through the image capturing control unit 21. The mask generation unit 16 transmits a request for superimposing a mask image to the image processing unit 15 based on the setting information about the privacy area received via the image capturing control unit 21. In response to the request, in S12, the image processing unit 15 generates an image on which a mask image is superimposed. In S13, the mask generation unit 16 stores in the mask data memory unit 17 the setting information about the set mask. In S14, the mask generation unit 16 determines, for example, whether the image capturing area is unchanged or the image capturing apparatus 1 is unmoved for a certain period of time.

In a case where the image capturing area is changed or the image capturing apparatus 1 is moved (NO in S14), the processing proceeds to S15. In S15, the mask generation unit 16 acquires a change of the captured image, e.g., a moving amount, and calculates a position of the changed privacy area based on the acquired moving amount and the setting information about the mask stored in the mask data memory unit 17. Thereafter, the processing returns to S12, and the mask generation unit 16 requests the image processing unit 15 to superimpose a mask image on the area corresponding to the calculated privacy area again. In S13, the mask generation unit 16 stores the setting information of the mask in the mask data memory unit 17. Herein, the mask image is set again depending on the movement for the purpose of description. However, the mask image may be constantly superimposed thereon by changing a position or a shape of the mask image depending on the moving amount. Further, a change of the image capturing area and detection and acquisition of a movement or movement amount of the image capturing apparatus 1 may be executed based on, for example, a request for changing a field of view received from the image capturing control unit 21, and the information about a difference between the images acquired by the image processing unit 15. Alternatively, the above-described detection and acquisition may be executed based on output values of various sensors (not illustrated) which can detect a movement of the image capturing apparatus 1.

In S14, if the image capturing area is unchanged or the image capturing apparatus 1 is unmoved for a certain period of time (YES in S14), the processing proceeds to S16. In S16, the mask generation unit 16 sets a pixel of the image sensor 12 corresponding to the privacy area as the uniform exposure area, and changes the exposure time to overexpose or underexpose the image. Thereafter, in S17, the mask generation unit 16 stops the superimposing processing of the mask image executed by the image processing unit 15. In S18, the mask generation unit 16 stores the setting information of the uniform exposure area in the mask data memory unit 17 and ends the processing.

Further, in a case where a movement of the image capturing apparatus 1, a change of the image capturing area, or the like are detected again, the mask generation unit 16 recalculates the privacy area from the setting information of the uniform exposure area stored in the mask data memory unit 17 and the moving amount, and switches the mask type to superimpose the mask image on a corresponding area through the image processing unit 15.

Through the above-described processing, a processing load caused by the processing for superimposing the mask image on the privacy area can be reduced when the image capturing area is unchanged or the image capturing apparatus 1 is unmoved.

<Another Example of Mask Type Changing Processing>

FIG. 11 is a flowchart illustrating another example of the processing for changing (switching) a mask type.

Hereinafter, the exemplary embodiment will be described with respect to the processing for switching a mask type executed when the number of mask images superimposable by the image processing unit 15 exceeds an upper limit value.

In S21, similarly to the processing illustrated in FIG. 10, the user sets a privacy area through the image capturing control unit 21. In S22, the mask generation unit 16 receives a request for setting the privacy area, and acquires the information about the number of mask images superimposed on the image data from the mask data memory unit 17. In S23, the mask generation unit 16 determines whether the number of superimposed mask images exceeds a predetermined value relating to a processing load. For example, the mask generation unit 16 determines whether the number of superimposed mask images exceeds an upper limit number (maximum number) of mask images superimposable by the image processing unit 15.

If the number of superimposed mask images does not exceed the upper limit value (YES in S23), the processing proceeds to S24. In S24, the mask generation unit 16 requests the image processing unit 15 to superimpose a mask image on the area corresponding to the set privacy area. If the number of superimposed mask images exceeds the upper limit value (NO in S23), the processing proceeds to S25. In S25, the mask generation unit 16 sets a pixel of the image sensor 12 corresponding to the set privacy area as the uniform exposure area, and changes the exposure time to overexpose or underexpose the image data. In S26, the mask generation unit 16 stores the set mask information in the mask data memory unit 17 and ends the processing.

In the above-described exemplary embodiment, a method of executing the masking processing is selected from a method of concealing the privacy area by changing the exposure condition of the uniform exposure area and a method of concealing the privacy area by superimposing a mask image, depending on the number of superimposed mask images. However, the exemplary embodiment is not limited thereto, and a type of masking processing may be selected by the user via the GUI 2 when a privacy area is set by the user.

With such a configuration, the user is allowed to set privacy areas of the number greater than the number of mask images superimposable by the image processing unit 15.

As described above, according to the present exemplary embodiment, it is possible to reduce a processing load caused by the processing for generating an image having a concealed privacy area in the image capturing area, while suppressing an increase in size of the apparatus.

Some embodiments can also be realized through the processing which is executed in such a way that a program for realizing one or more functions according to the above-described exemplary embodiments is supplied to a system or an apparatus via a network or a storage medium, and one or more processors in the system or the apparatus read and execute the program. Further, some embodiments can also be realized with a circuit such as an application specific integrated circuit (ASIC) which realizes one or more functions. The above-described program is a computer readable program associated with the contents of the flowcharts illustrated in the appended drawings described in the exemplary embodiments.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Applications No. 2021-013539, filed Jan. 29, 2021, and No. 2021-013540, filed Jan. 29, 2021, which are hereby incorporated by reference herein in their entireties.

What is claimed is:

1. An image capturing apparatus comprising:
an image sensor that can set an exposure condition for each of areas on an image capturing plane of the image sensor;
at least one processor; and
a memory coupled to the at least one processor, the memory storing instructions that, when executed by the at least one processor, cause the at least one processor to:
set a privacy area in a captured image that was captured by the image sensor;
decide an exposure condition of the privacy area as an exposure condition that enables privacy of an object in the privacy area to be protected; and
control for causing the image sensor to capture an image of the object based on the decided exposure condition.

2. The image capturing apparatus according to claim 1, wherein the instructions further cause the at least one processor to execute processing for superimposing a predetermined image on the privacy area, and
wherein either one of a control for causing the image sensor to capture an image of the object based on the decided exposure condition and the processing is executed.

3. The image capturing apparatus according to claim 1, wherein, in a case where a luminance value of image data in the privacy area is greater than or equal to a predetermined threshold, the at least one processor decides that the exposure condition of the privacy area has a value greater than or equal to a predetermined value.

4. The image capturing apparatus according to claim 1, wherein, in a case where a luminance value of image data in the privacy area is smaller than or equal to a predetermined threshold, the at least one processor decides that the exposure condition of the privacy area has a value smaller than or equal to a predetermined value.

5. The image capturing apparatus according to claim 1, wherein the instructions cause the at least one processor to decide the exposure condition of the privacy area based on a luminance distribution of image data of the privacy area.

6. The image capturing apparatus according to claim 1, wherein the instructions cause the at least one processor to decide the exposure condition of the privacy area based on a maximum luminance value or a minimum luminance value of pixels of image data of the privacy area.

7. The image capturing apparatus according to claim 1, wherein, in a case where a maximum luminance value of pixels of image data of the privacy area does not exceed a predetermined value, the exposure condition is decided such that luminance values of the pixels are minimum value of the luminance values or values in a neighborhood of a minimum value.

8. The image capturing apparatus according to claim 1, wherein, in a case where a maximum luminance value of pixels of image data of the privacy area exceeds the predetermined value, the exposure condition is decided such that luminance values of the pixels are maximum value of the luminance values or values in a neighborhood of a maximum value.

9. The image capturing apparatus according to claim 2, wherein the instructions further cause the at least one processor to detect a change of the image captured by the image sensor,
wherein the processing for superimposing a predetermined image on the privacy area is executed based on the change of the image captured by the image sensor, the change being detected.

10. The image capturing apparatus according to claim 2, wherein the instructions cause the at least one processor to control the image sensor to execute any one of the control and the processing for each of a plurality of privacy areas including the privacy area.

11. The image capturing apparatus according to claim 1, wherein the instructions further cause the at least one processor to receive the exposure condition from an outside,
wherein, a control for causing the image sensor to capture an image of the object based on the decided exposure condition is executed to capture the image of the object based on the received exposure condition.

12. The image capturing apparatus according to claim 11, wherein the instructions further cause the at least one processor to determine whether privacy of the object can be protected by the received exposure condition,
wherein the control for causing the image sensor to capture an image of the object based on the decided exposure condition is executed to capture the image of the object under the received exposure condition only in a case where the at least one processor determines that privacy of the object can be protected by the received exposure condition.

13. The image capturing apparatus according to claim 1, wherein the exposure condition includes at least any one of analog gain of the image sensor and exposure time.

14. A method for controlling an image capturing apparatus comprising:
setting an exposure condition for each of areas on an image capturing plane;
setting a privacy area in a captured image;
deciding an exposure condition of the set privacy area as an exposure condition which enables privacy of an object in the privacy area to be protected; and
executing control for causing an image of the object to be captured based on the decided exposure condition.

15. The method for controlling the image capturing apparatus according to claim 14, further comprising executing control for causing any one of the control and processing for superimposing a predetermined image on the privacy area to be executed.

16. The method for controlling the image capturing apparatus according to claim 14, further comprising deciding that the exposure condition of the privacy area has a value greater than or equal to a predetermined value in a case where a luminance value of image data in the privacy area is greater than or equal to a predetermined threshold.

17. The method for controlling the image capturing apparatus according to claim 14, further comprising deciding that the exposure condition of the privacy area has a value smaller than or equal to a predetermined value in a case where a luminance value of image data in the privacy area is smaller than or equal to a predetermined threshold.

18. The method for controlling the image capturing apparatus according to claim 14, further comprising deciding the exposure condition of the privacy area based on a luminance distribution of image data of the privacy area.

19. The method for controlling the image capturing apparatus according to claim 14, further comprising deciding the exposure condition of the privacy area based on a maximum luminance value or a minimum luminance value of pixels of image data of the privacy area.

20. A non-transitory computer-readable storage medium storing a program for causing a computer to execute a method comprising:
setting an exposure condition for each of areas on an image capturing plane;
setting a privacy area in a captured image;
deciding an exposure condition of the set privacy area as an exposure condition which enables privacy of an object in the privacy area to be protected; and
executing control for causing an image of the object to be captured based on the decided exposure condition.

* * * * *